United States Patent
Bargman et al.

(10) Patent No.: US 10,914,212 B1
(45) Date of Patent: Feb. 9, 2021

(54) 48V ELECTRICALLY HEATED CATALYST SYSTEM FOR A VEHICLE

(71) Applicant: Vitesco Technologies USA, LLC, Auburn Hills, MI (US)

(72) Inventors: Benjamin Bargman, Beverly Hills, MI (US); Brian J. McKay, West Bloomfield, MI (US); Abhid Akram Abubeckar Mohamed Sahul, Rochester Hills, MI (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 0 days.

(21) Appl. No.: 16/666,462

(22) Filed: Oct. 29, 2019

(51) Int. Cl.
| | |
|---|---|
| *F01N 3/20* | (2006.01) |
| *H01G 11/10* | (2013.01) |
| *H01M 10/06* | (2006.01) |
| *H01G 11/08* | (2013.01) |
| *F01N 3/10* | (2006.01) |

(52) U.S. Cl.
CPC ............ *F01N 3/2013* (2013.01); *F01N 3/101* (2013.01); *H01G 11/08* (2013.01); *H01G 11/10* (2013.01); *H01M 10/06* (2013.01); *H01M 2220/20* (2013.01)

(58) Field of Classification Search
CPC ....... F01N 3/2013; F01N 3/101; H01G 11/08; H01G 11/10; H01M 10/06; H01M 2220/20

USPC ..................................................... 60/299–302
See application file for complete search history.

(56) References Cited

U.S. PATENT DOCUMENTS

| | | | | |
|---|---|---|---|---|
| 5,140,812 A | * | 8/1992 | Cornelison | F01N 3/281 60/300 |
| 5,680,503 A | * | 10/1997 | Abe | F01N 3/2803 392/485 |
| 7,976,801 B2 | * | 7/2011 | Kammel | B01D 46/2407 423/212 |
| 10,578,039 B2 | * | 3/2020 | McKay | F01N 3/32 |
| 2012/0324868 A1 | * | 12/2012 | Kim | F01N 3/2013 60/274 |
| 2019/0023201 A1 | * | 1/2019 | Ing | B60L 50/15 |

* cited by examiner

*Primary Examiner* — Hoang M Nguyen

(57) ABSTRACT

A method is provided for powering a 48V electrically heated catalyst of a catalytic converter of a vehicle without using a 48V battery. The method provides a 12V battery. An electrical energy storage device is electrically connected between the electrically heated catalyst and the 12V battery. The electrical energy storage device is charged by the 12V battery so as to store a voltage of 12V that can then be switched to 48V. The electrically heated catalyst is powered with 48V supplied by the charged electrical energy storage device. A system for performing the method is also disclosed.

19 Claims, 4 Drawing Sheets

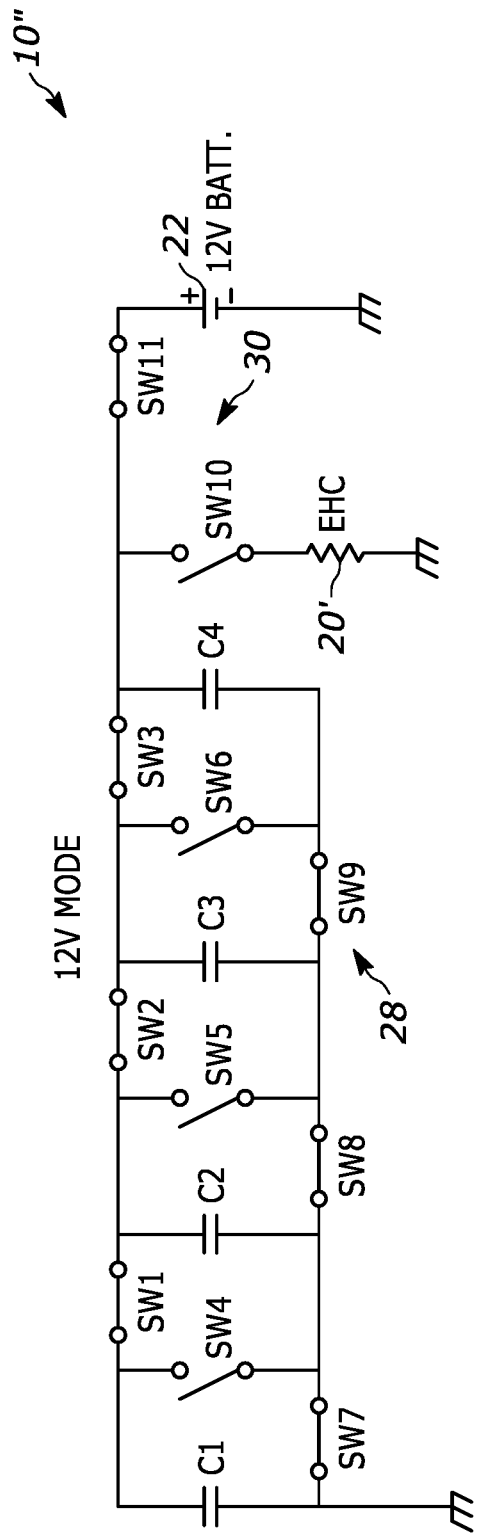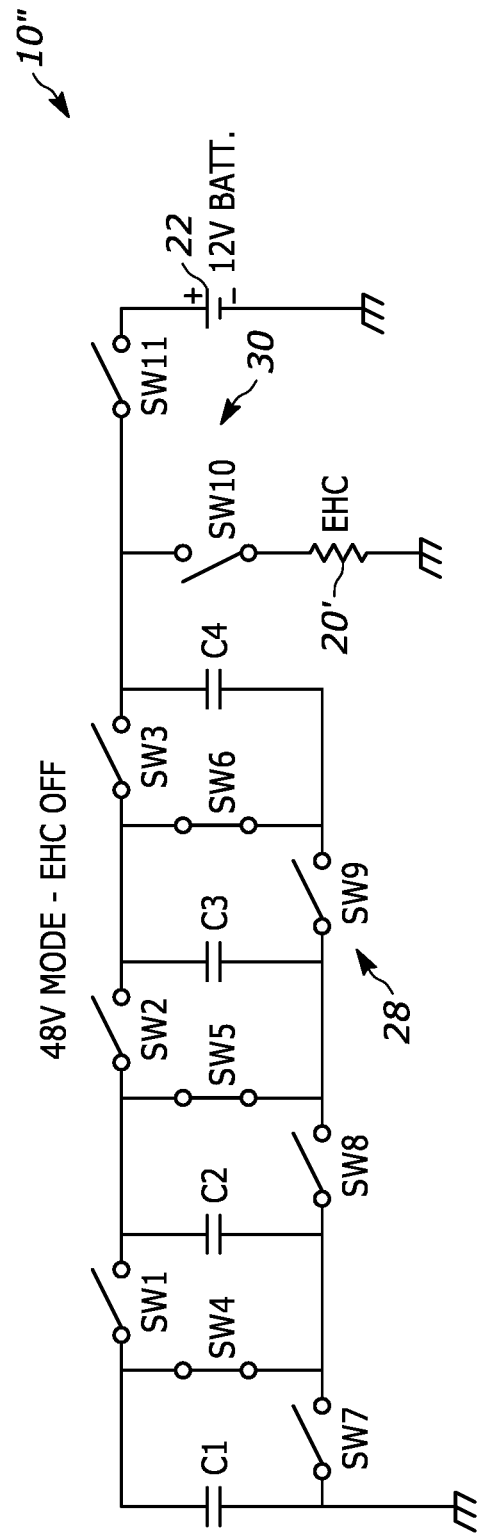
FIG. 5A
FIG. 5B

48V ELECTRICALLY HEATED CATALYST SYSTEM FOR A VEHICLE

FIELD

This invention relates to a vehicle emission system with an Electrically Heated Catalyst (EHC) and, more particularly, to an emission system having a 48V EHC and a 12V battery as the sole power source.

BACKGROUND

With reference to FIG. 1, a conventional vehicle emissions system is shown generally indicated at 10 for use with an internal combustion engine. The engine 12 has an intake 14 and an exhaust 16. The system 10 includes a three-way catalytic converter 18 that is coupled to the exhaust 16. The catalytic converter 18 includes a 12V operated electrically heated catalyst (EHC) 20 that is powered by a 12V lead acid battery 22 to reduce the cold-start emission since it enables fast light off for the for the catalytic converter 18. However, the 12V battery 22 is not able to supply enough power to the 12V operated EHC 20 to fully utilize the potential of the EHC 20 due to limitations of the lead acid and absorbed glass mat (AGM) batteries.

FIG. 2 shown another conventional vehicle emissions system, generally indicated at 10'. The system 10' includes the three-way catalytic converter 18 coupled to the exhaust 16 of the engine 12. The catalytic converter 18 includes a 48V operated electrically heated catalyst (EHC) 20' that is powered by a 48V lithium based battery 24 to reduce the cold-start emission. Power from the 12V battery 22 is directed to a DC-DC converter 26 which charges the 48V battery 24. The 48V system 10' can provide more power to the EHC 20', but is not desirable due to the additional components and poor low-temperature performance of the 48V lithium based battery 24.

In FIGS. 1 and 2, electricity transfer from the battery 22 or 24 to the EHC 20 is shown by the solid lines and electrical connection between components is shown by dashed lines.

Thus, there is a need to provide a vehicle emissions system using a 12V battery as the sole power source for powering a 48V operated EHC, with the system providing a high heating capacity at a cost lower than the conventional 48V battery powered EHC system.

SUMMARY

An objective of the invention is to fulfill the need referred to above. In accordance with the principles of an embodiment, this objective is achieved by a system including a vehicle catalytic converter having an electrically heated catalyst constructed and arranged to be powered by 48V, a 12V battery, and an electrical energy storage device, electrically connected between the electrically heated catalyst and the 12V battery, constructed and arranged to 1) be charged by the 12V battery to store voltage, and 2) to power the electrically heated catalyst with 48V.

In accordance with another aspect of an embodiment, a method is provided for powering a 48V electrically heated catalyst of a catalytic converter of a vehicle without a 48V battery. The method provides a 12V battery. An electrical energy storage device is electrically connected between the electrically heated catalyst and the 12V battery. The electrical energy storage device is charged by the 12V battery so as to store a voltage. The charged electrical energy storage device switches to 48V to power the 48V electrically heated catalyst.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 5A is a circuit diagram of the vehicle emissions system of FIG. 3 operating in the 12V mode.

FIG. 5B is a circuit diagram of the vehicle emissions system of FIG. 4 operating in the 48V mode, with the EHC powered off.

FIG. 5C is a circuit diagram of the vehicle emissions system of FIG. 4 operating in the 48V mode, with the EHC powered on.

DETAILED DESCRIPTION OF AN EXEMPLARY EMBODIMENT

Figure 3:
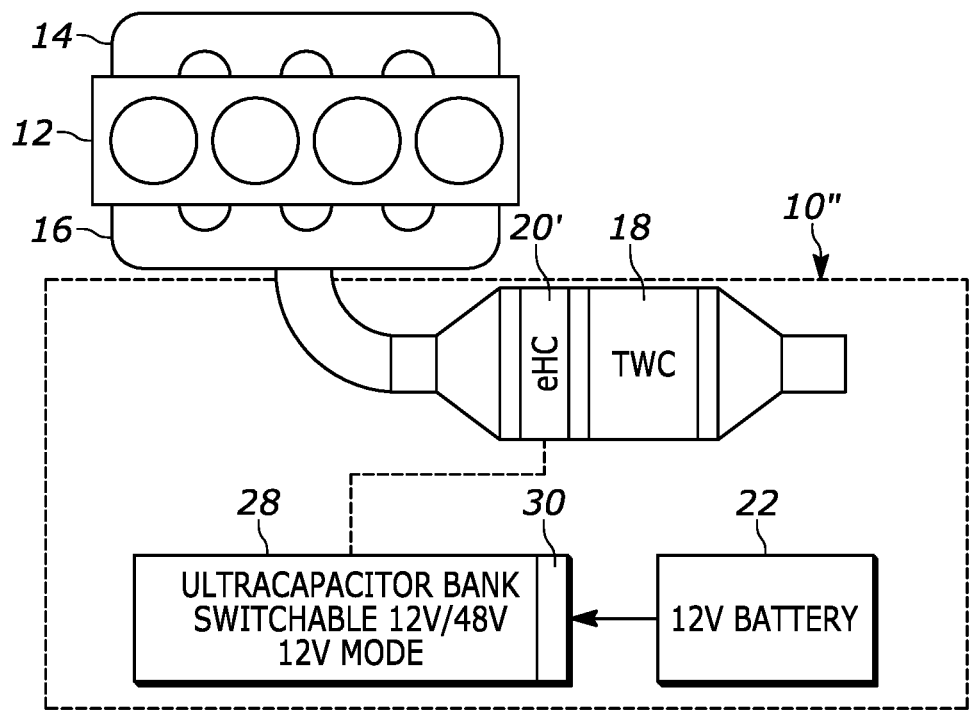
FIG. 3 is a schematic view of a vehicle emissions system in accordance with an embodiment, shown coupled to an engine exhaust, and having an ultracapacitor bank, shown operating in a 12V mode with a 12V battery charging the ultracapacitor bank.

With reference to FIG. 3, a vehicle emissions system is shown, generally indicated at 10", in accordance with an embodiment, for use with an internal combustion engine 12 having an intake 14 and an exhaust 16. The system 10" includes a catalytic converter 18, preferably of the 3-way type, that is configured to be coupled to the exhaust 16. The catalytic converter 18 includes a 48V operated electrically heated catalyst (EHC) 20'. In accordance with the embodiment, an ultracapacitor structure or bank 28 is electrically connected between the EHC 20' and a 12V battery 22, preferably a lead-acid battery. The ultracapacitor bank 28 comprises a plurality of individual ultracapacitors C1-C4 (FIG. 5A) wired together to increase their voltage or power. Each ultracapacitor C1-C4 can be an arrangement of multiple capacitors to achieve 12V. Ultracapacitors are conventional electrical energy storage devices that have the ability to store a large amount of electrical charge.

In accordance with the embodiment, the ultracapacitor bank 28 includes switches 30 (FIG. 3) so as to be switched between two operating modes. As shown in FIG. 5A, the switches 30 can include switches SW1-SW11 that can be controlled by a controller (not shown). In a 12V charging mode, switches SW1, SW2, SW3, SW7, SW8, SW9 and SW11 are closed such that the 12V battery 22 is used to slowly charge the ultracapacitor bank 28 to store a voltage that can later be switched to achieve 48V. No power is sent to the EHC 20' since switch SW10 is open.

As shown in FIG. 5B, in a 48V mode with the EHC off, only switches SW4, SW5 and SW6 are closed, maintaining the ultracapacitor bank 28 with a 48V charge.

Figure 4:
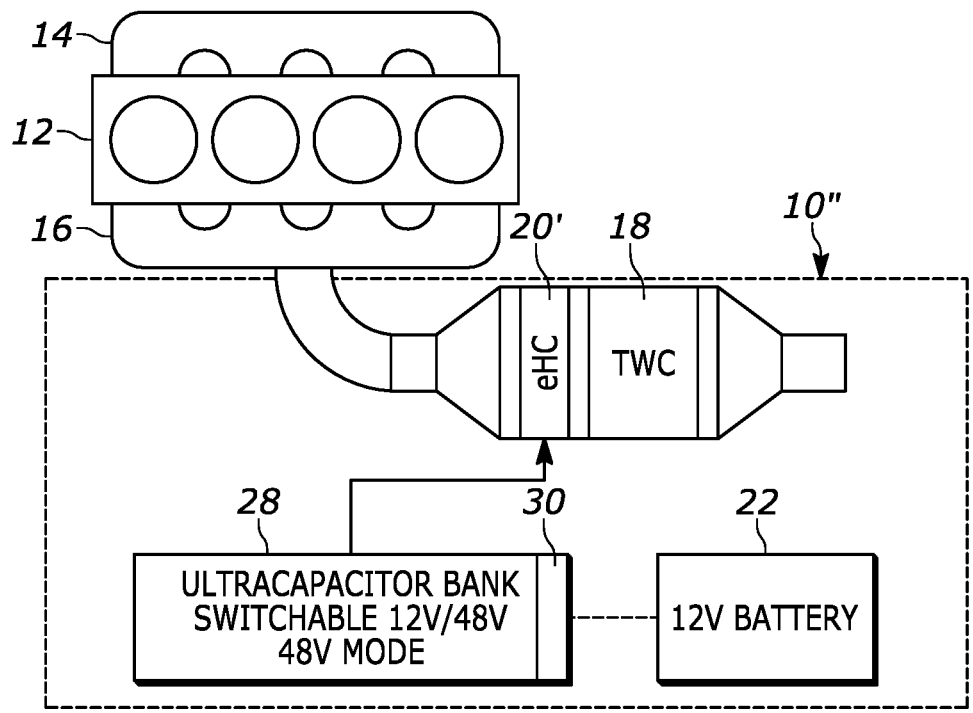
FIG. 4 is a schematic view of a vehicle emissions system of FIG. 3, but shown operating in a 48V mode, with the ultracapacitor bank providing 48V power to the EHC.
Figure 5C:
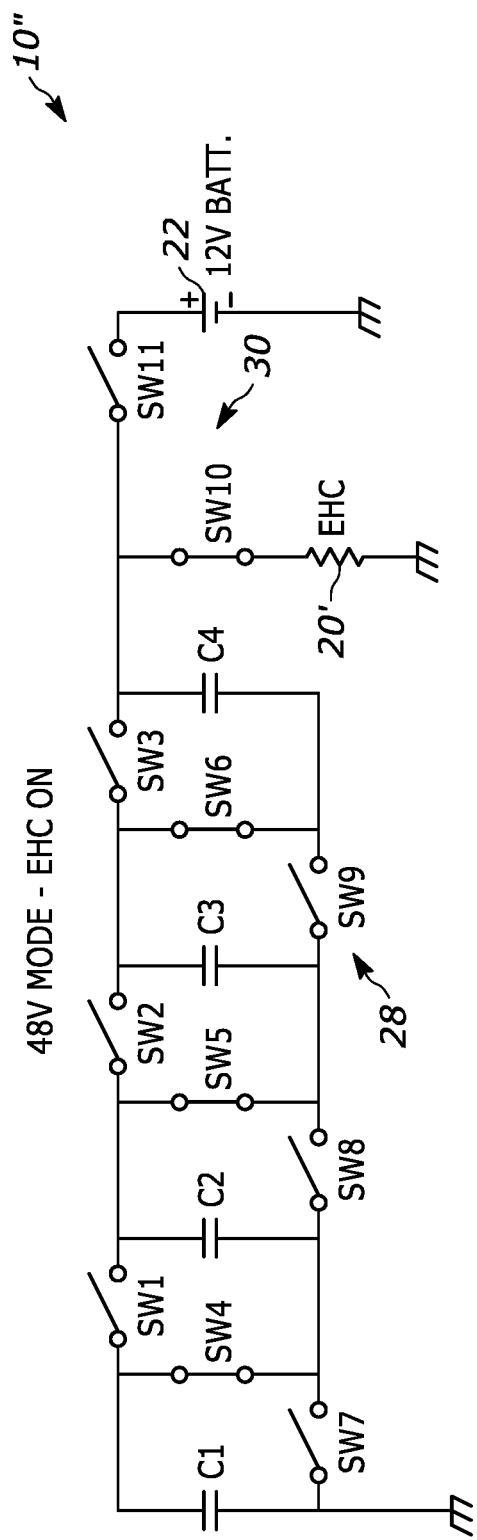

With reference to FIGS. 4 and 5C, in a 48V mode with the EHC on (powering mode), switches SW4, SW5, SW6, and SW10 are closed placing the capacitors C1-C4 in series, such that the fully charged ultracapacitor bank 28 provides 48V power to the EHC 20'. The powering mode occurs when the engine 12 is running.

In FIGS. 3 and 4, electricity transfer is shown by the solid lines and electrical connection between components is shown by dashed lines.

Figure 1:
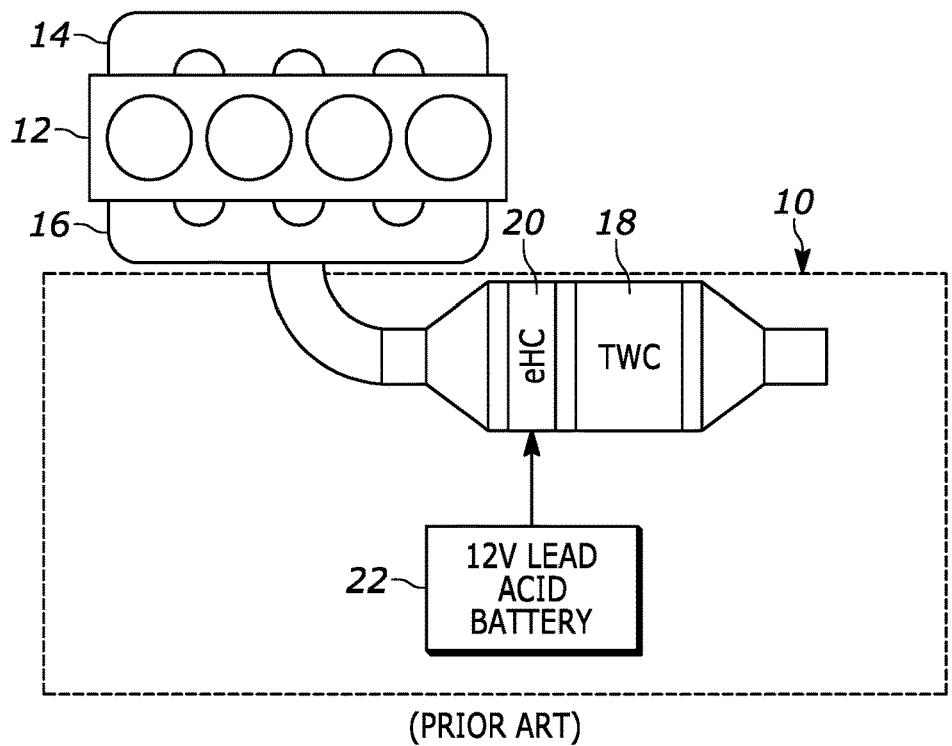
FIG. 1 is a schematic view of a conventional vehicle emissions system having an EHC powered by a 12V lead acid battery, shown coupled to an engine exhaust.
Figure 2:
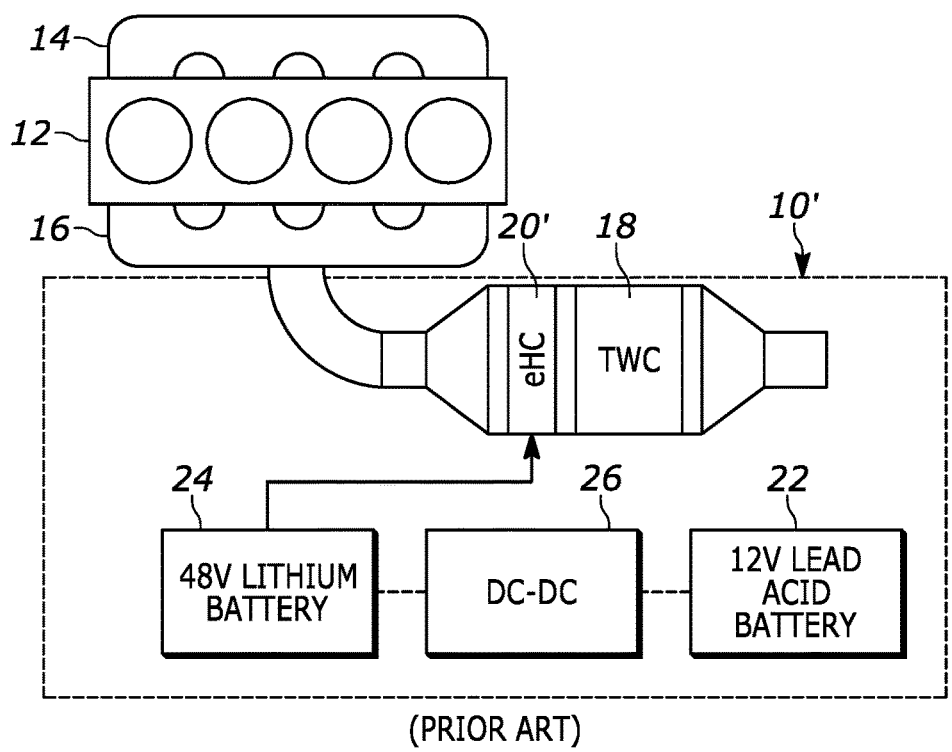
FIG. 2 is a schematic view of a conventional vehicle emissions system having an EHC powered by a 48V lithium based battery, shown coupled to an engine exhaust.

The system 10" reduces the components needed as compared to the system 10' since the ultracapacitor bank 28 is provided instead of the 48V battery and the DC-DC converter of system 10' of FIG. 2. Also, the system 10" provides better low temperature performance since no 48V lithium based battery is needed, due to the capacitors being the power source. Still further, if 48V is only needed to power the EHC, the system 10" reduces complexity.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A system comprising:
    an electrically heated catalyst constructed and arranged to be powered by 48V,
    a 12V battery, and
    an electrical energy storage device, electrically connected between the electrically heated catalyst and the 12V battery, constructed and arranged to 1) be charged by the 12V battery to store voltage, and 2) to power the electrically heated catalyst with 48V.

2. The system of claim 1, wherein the electrical energy storage device is an ultracapacitor structure.

3. The system of claim 2, wherein the ultracapacitor structure comprises a plurality of ultracapacitors wired together.

4. The system of claim 1, further comprising a plurality of switches associated with the electrical energy storage device, the 12V battery, and the electrically heated catalyst, the switches being constructed and arranged to permit switching between a charging mode for charging the electrical energy storage device by the 12V battery, and a powering mode of operation for providing the 48V power to the electrically heated catalyst.

5. The system of claim 1, wherein the 12V battery is a lead acid battery.

6. The system of claim 1, wherein the electrically heated catalyst is constructed and arranged to receive exhaust from an internal combustion engine.

7. A system comprising:
    a vehicle catalytic converter having an electrically heated catalyst constructed and arranged to be powered by 48V,
    a 12V battery, and
    an electrical energy storage device, electrically connected between the electrically heated catalyst and the 12V battery, constructed and arranged to 1) be charged by the 12V battery to store voltage, and 2) to power the electrically heated catalyst with 48V.

8. The system of claim 7, wherein the electrical energy storage device is an ultracapacitor structure.

9. The system of claim 8, wherein the ultracapacitor structure comprises a plurality of ultracapacitors wired together.

10. The system of claim 9, further comprising a plurality of switches associated with the electrical energy storage device, the 12V battery, and the electrically heated catalyst, the switches being constructed and arranged to permit switching between a charging mode for charging the electrical energy storage device by the 12V battery, and a powering mode of operation for providing the 48V power to the electrically heated catalyst, the powering mode occurring when the plurality of ultracapacitors are switched to be in series.

11. The system of claim 7, further comprising an internal combustion engine, the catalytic converter being coupled to an exhaust of the internal combustion engine.

12. The system of claim 7, wherein the 12V battery is a lead acid battery.

13. A method for powering a 48V electrically heated catalyst of a catalytic converter of a vehicle without using a 48V battery, the method comprising the steps of:
    providing a 12V battery,
    electrically connecting an electrical energy storage device between the electrically heated catalyst and the 12V battery,
    charging the electrical energy storage device by the 12V battery so as to store voltage, and
    switching the charged electrical energy storage device to 48V to power the 48V electrically heated catalyst.

14. The method of claim 13, wherein the electrical energy storage device is an ultracapacitor structure.

15. The method of claim 14, wherein the ultracapacitor structure comprises a plurality of ultracapacitors wired together.

16. The method of claim 13, further comprising providing a plurality of switches associated with the electrical energy storage device, the 12V battery and electrically heated catalyst for switching between the charging step and the switching step.

17. The method of claim 13, wherein the 12V battery is provided as a lead acid battery.

18. The method of claim 7, wherein the catalytic converter is coupled with an exhaust of an internal combustion engine, and wherein powering step occurs while the engine is running.

19. The method of claim 16, wherein the switching step includes operating certain switches so that the ultracapacitors are in series.

* * * * *